May 26, 1942.   C. F. HAMMOND ET AL   2,284,202
SHOCK ABSORBING STEERING GEAR
Filed May 8, 1941
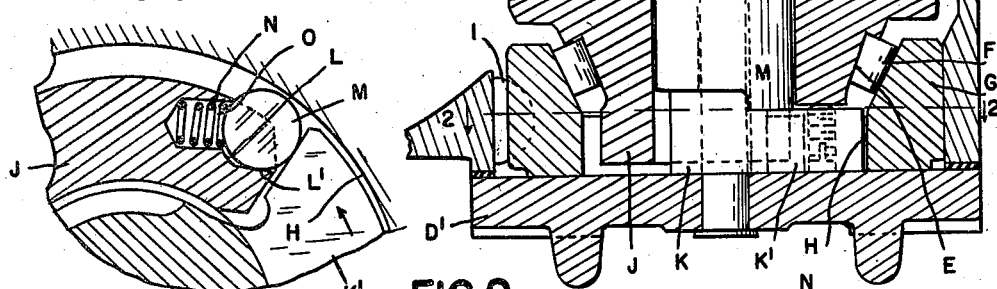
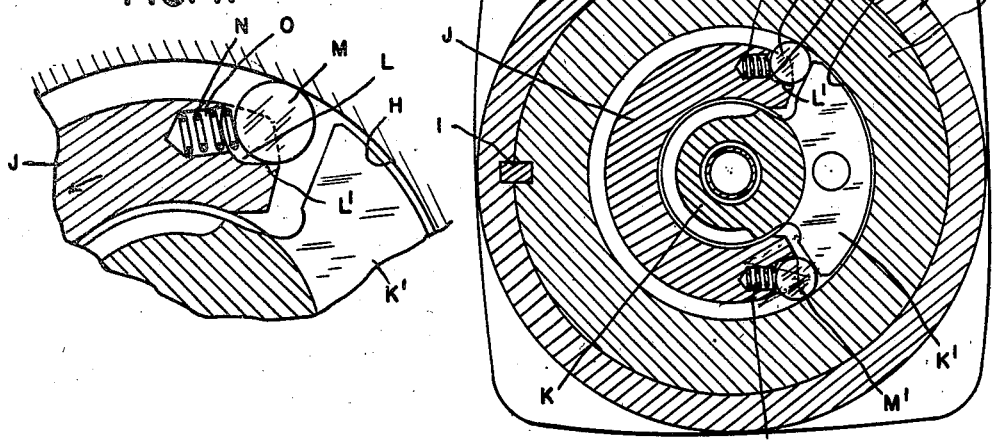
INVENTORS
CHARLES F. HAMMOND
HARPER E. PULLEYBLANK
BY
ATTORNEYS Patented May 26, 1942

2,284,202

UNITED STATES PATENT OFFICE 2,284,202

SHOCK ABSORBING STEERING GEAR

Charles F. Hammond, Grosse Pointe, and Harper E. Pulleyblank, Detroit, Mich., assignors to Gemmer Manufacturing Company, Detroit, Mich., a corporation of Michigan Application May 8, 1941, Serial No. 392,563

5 Claims. (Cl. 192—7)

The invention relates to steering gears more particularly designed for use on trucks and heavy motor vehicles and, as the object of the invention, to provide means for absorbing road shocks so as to prevent the transmission thereof to the hand wheel. The invention, therefore, consists in the construction of shock absorbing means and its combination with the steering mechanism, as hereinafter set forth.

In the drawing:

Fig. 1 is a vertical central longitudinal section through a portion of the steering gear and the shock absorbing means;

Fig. 2 is a horizontal section on line 2—2 of Fig. 1;

Fig. 3 is a similar view, illustrating the parts in position for the transmission of rotary motion from the steering stem to the worm; and Fig. 4 is a similar view, with the parts in locked position preventing transmission of shocks from the worm to the steering stem.

Our improved steering gear is of the type in which the rotary movement of the hand wheel is transmitted to the ground wheel turning mechanism through the medium of a worm gearing. As illustrated in Fig. 1, A is the steering stem, and B a worm revolubly mounted on said stem and which is preferably of the hour-glass type. C is the worm wheel (not fully shown), and D is the housing for enclosing the worm and gear. The worm is preferably rotatably mounted within this housing D, preferably through the medium of combined radial and end thrust roller bearings. As shown, these bearings include a cone member E integral with and projecting from the end of the worm B and engaging rolls F which, in turn, engage an annular race member G within the housing D. Only the lower bearing is illustrated in Fig. 1, but it is to be understood that there is a similar bearing for the upper end of the worm. D' is a removable cap completing the enclosure of the housing D.

The shock absorbing means is preferably located within the housing D adjacent to the lower end of the worm and is of the following construction. H is a cylindrical surface, preferably integral with the race member G and together therewith forming a rigid annulus. This annulus is non-rotatably secured within the housing D by suitable means such as a key I. J is a segmental projection integral with the worm B, which enters the space within the cylindrical surface H adjacent to but out of contact therewith. K is a portion of the stem A extending into the space within the segment J and provided with a lateral extension K' which forms a segment substantially complementary to said segment J. There is, however, a slight clearance between adjacent ends of the segments J and K, which permits a limited independent movement. The segment J is provided at its opposite ends with recesses L for respectively receiving rolls M and M'. These recesses are so fashioned as to form bearing surfaces L' for the rolls, which surfaces are non-parallel to the adjacent portion of the cylindrical surface H. The arrangement is such that the outer end portions of the surfaces L' are spaced from the surface H less than the diameter of the rolls M, M', while at the inner ends of the recesses L the space between the surfaces L' and H is slightly greater than the diameter of the rolls. N are springs arranged in pockets O in the segment J and bearing against the rolls M, M' to yieldably urge them outward in the recesses L.

With the construction as described, it will be understood that rotary motion in either direction imparted to the stem A by the hand wheel (not shown) will be transmitted to the worm through the medium of the segments K' and J and the intermediate rolls M and M'. If, as shown in Fig. 3, the segment K' is moved counter-clockwise, the roll M at its forward end will contact with the adjacent end of the segment J and in so doing will be moved inward in the recess L against the rear wall thereof. This will free the roll from contact with the surface H, but will transmit torque therethrough to the segment J. Continued rotation in the same direction will move together the segments K' and J and the roll M, so that the worm B will rotate with the stem A. The same would be true if the segment K' were to be rotated in the opposite direction or clockwise, as this would contact the roll M' with the segment J, moving said roll inward to the bottom of the recess L and freeing it from the surface H. Thus, the worm is free to revolve in either direction when actuated by the segment K'.

As the worm B and worm wheel C do not constitute a completely irreversible transmission, it is obvious that any road shock or exceptionally heavy stress transmitted from the ground wheels of the vehicle to the worm B would, in the absence of shock absorbing means, be transmitted from the worm to the stem a. Such transmission is, however, prevented by the rolls M and M'. Thus, as shown in Fig. 4, assuming that the segment J is actuated by a road shock in an anti-clockwise direction, as indicated by the arrow, then the roll M, which is yieldably pressed in the reverse direction by the spring N, will wedge between the surfaces L' and H. This will produce a stress transmitted from the surface L' to the roll M, with a reaction of the latter against the surface H which, being within the angle of friction, will lock the worm, preventing transmission of the shock to the stem. A similar locking would be effected if the segment J were revolved in the opposite direction through the medium of the roll M'.

One important advantage in the construction as above described is that it requires but slight modification of a construction of steering gear unprovided with shock absorbing means. Thus, the annular race member G which forms a part of the radial and end thrust bearing for the worm is only modified by extending it to include the cylindrical surface H. The worm B also is only modified by being provided with the extension forming the segment J, while the stem A is modified only by providing it with the extension forming the segment K'. Thus, the additional cost of manufacture of the shock absorbing construction over that unprovided in the shock absorbing means is comparatively slight.

While we have described our improved shock absorbing means as applied to a worm gearing, it is obvious that it would be equally applicable to other forms of gearing.

An essential feature is the rigid annular member, preferably formed of hardened steel, the segments within said annular member respectively connected to the stem and one of the gears, and the floating means between said segments coacting therewith and with said annular member to lock when actuated by the gear.

What we claim as our invention is:

1. In a steering gear, the combination with a steering stem, of a gearing including a worm sleeved upon said stem, a casing enclosing said gearing, a non-revoluble rigid annular member within said casing adjacent to one end of said worm and concentric therewith, segments respectively on said worm and stem projecting into said annular member in the same plane therewith but on opposite sides of the axis, and a floating member between said segments and annular member adapted to revolve freely with said stem and worm when actuated by the former and to lock with said annular member when actuated by the worm.

2. In a steering gear, the combination with a steering stem, of a gearing including a worm sleeved upon said stem, a casing enclosing said gearing, a roller bearing for said worm adjacent one end thereof including an annular member non-rotatively secured within said casing, said member having a portion with a conical surface for engaging the rolls of said roller bearing, and a portion provided with a cylindrical inner surface, segments respectively on said worm and stem projecting into the portion of said annular member having the cylindrical surface and on opposite sides of the axis thereof, and a floating member positioned between said segments and cylindrical surface adapted to freely revolve with said worm and stem when actuated by the latter and to frictionally lock with said cylindrical surface when actuated by said worm.

3. In a steering gear, the combination with a steering stem, of a gearing including a worm sleeved upon said stem, a casing enclosing said gearing, a roller bearing for one end of said worm including an annular member non-rotatively secured within said casing, said annular member having a portion with a conical surface for engaging the rolls of said bearing, and an adjacent portion with a cylindrical inner surface, segments respectively on said worm and stem projecting into the space enclosed by said cylindrical surface, and a roll between and having surface contacts with said segments and said cylindrical surface, the relative angles of said surfaces being such as to produce a reaction between said roll and cylindrical surface which is outside of the angle of friction when driven by the segment on said stem and which is close to the angle of friction when driven by the segment on said worm.

4. In a steering gear, the combination with a steering stem, of a gearing including a worm sleeved upon said stem, a casing enclosing said gearing, a roller bearing for one end of said worm including an annular member non-rotatively secured within said casing, said annular member having a portion with a conical surface for engaging the rolls of said bearing, and an adjacent portion with a cylindrical inner surface, segments respectively on said worm and stem projecting into the space enclosed by said cylindrical surface, and a pair of rolls respectively between and having surface contact with opposite ends of said segments and said cylindrical surface, the relative angles of said contacts being such as to produce a reaction between said rolls and cylindrical surface which is outside the angle of friction when actuated by the stem segment in either direction and which is inside the angle of friction when actuated by said worm segment.

5. In a steering gear, the combination of a steering stem and a gearing including a gear sleeved upon said stem, a casing enclosing said gearing, a non-revoluble rigid annular member within said casing adjacent to said gear and stem and concentric therewith, segments respectively on said gear and stem projecting into said annular member in the same plane therewith but on opposite sides of the axis, and floating means between said segments and annular member adapted to revolve freely with said stem and gear when actuated by the former and to lock with said annular member when actuated by the gear.

CHARLES F. HAMMOND.
HARPER E. PULLEYBLANK.